Patented Dec. 19, 1922.

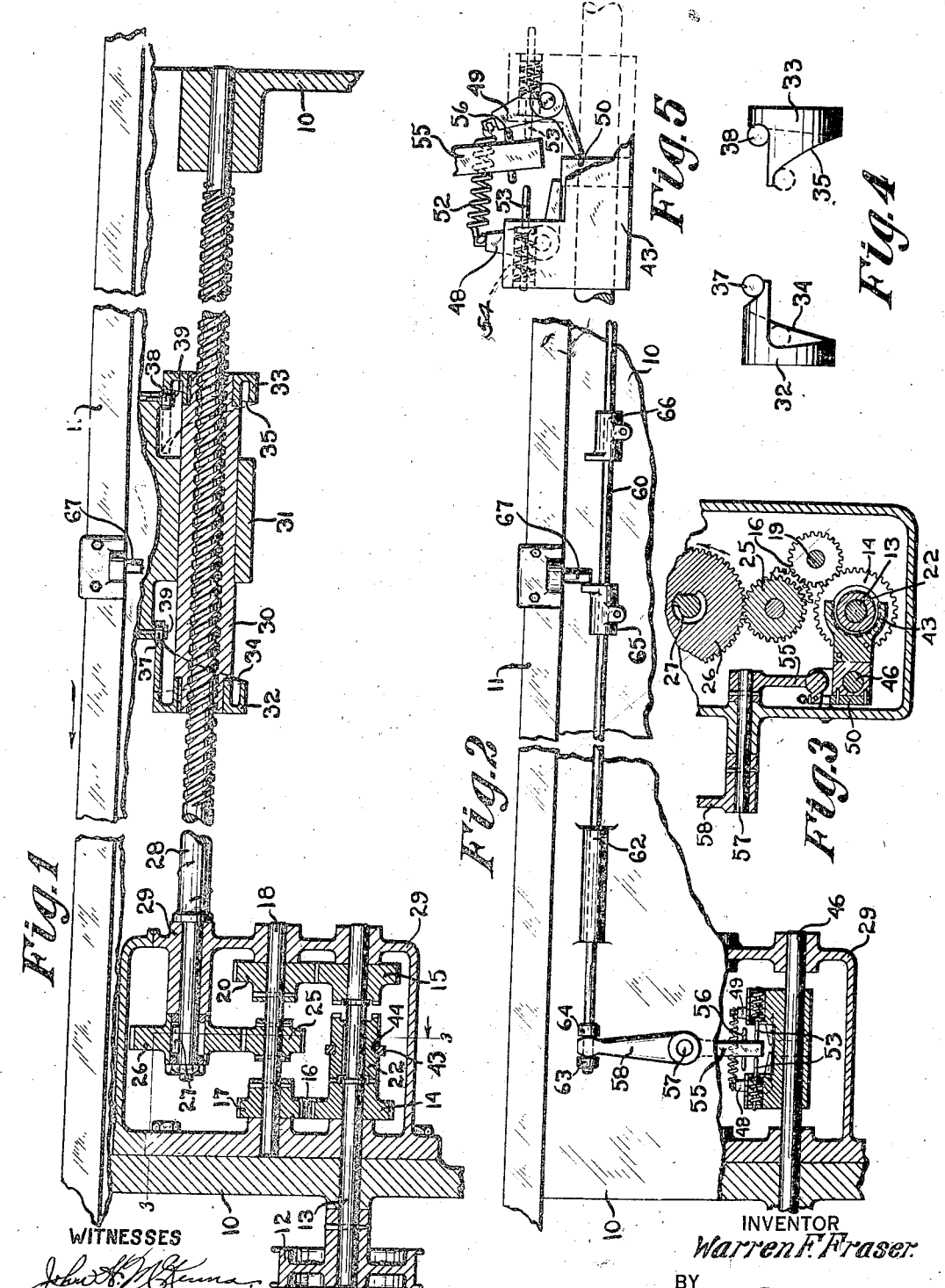

1,439,304

UNITED STATES PATENT OFFICE.

WARREN F. FRASER, OF WESTBORO, MASSACHUSETTS, ASSIGNOR TO NORTON COMPANY, OF WORCESTER, MASSACHUSETTS, A CORPORATION OF MASSACHUSETTS.

EASY-START REVERSING MECHANISM FOR MACHINE-TOOL TABLES.

Application filed May 5, 1922. Serial No. 558,575.

*To all whom it may concern:*

Be it known that I, WARREN F. FRASER, a citizen of the United States of America, residing at Westboro, in the county of Worcester and State of Massachusetts, have invented certain new and useful Improvements in Easy-Start Reversing Mechanisms for Machine-Tool Tables, of which the following is a full, clear, and exact specification.

My invention relates to a driving and reversing mechanism for the tables of machine tools, such as grinding and milling machines, and more particularly to a mechanism for obtaining an easy start and stop upon reversal in direction of traverse of the table.

It has been proposed to reciprocate a machine tool table by means of a screw and nut, the nut being fastened to the table and the screw rotatably mounted on the machine base for rotation in opposite directions. Such constructions employed in the prior art, while possessing obvious advantages, have been open to the objection that the table cannot be reciprocated rapidly without causing a shock and objectionable vibration at the end of each stroke.

It is accordingly an object of my invention to provide a mechanism comprising a screw and nut for reciprocating a machine tool table at a rapid rate without shock at the moment of reversal and to provide a simplified construction which is easily built and applied to the older types of machine for effecting this result.

With this and other objects in view, as will be apparent from the following disclosure, my invention resides in the combination of parts set forth in the specification and covered by the claims appended hereto.

In the drawings in which one embodiment of my invention is illustrated:

Figure 1 is a fragmentary elevation, largely in section, showing my reversing mechanism;

Fig. 2 is a side elevation, partly broken away and partly in section, to indicate the means for shifting the clutch;

Fig. 3 is a section on the line 3—3 of Fig. 1;

Fig. 4 is an elevation of the cams shown in Fig. 1 detached from the other parts; and Fig. 5 is a detail showing in elevation the operation of the clutch throwing mechanism.

As a specified embodiment of my invention, I have shown in the drawings a portion of a machine tool, such as a grinding machine, which comprises a base 10 carrying a table 11 suitably mounted for reciprocation thereon, as is customary in this art. A simplified mechanism for traversing the table may comprise any source of power such as a driving pulley 12 mounted on the shaft 13 projecting outwardly from the base. This shaft connects with the table through a reversing mechanism, which is herein simply illustrated as comprising gears 14 and 15 loosely mounted for rotation on the shaft 13. The gear 14 meshes with an intermediate gear 16 which in turn is in mesh with a gear 17 mounted on the shaft 18, gear 16 being suitably mounted on a pin 19 projecting from the machine base 10. The other gear 15 similarly meshes directly with the gear 20 on the same shaft 18. In order to connect one of the gears 14 and 15 to the shaft 13, a clutch member 22 of the usual type is slidably keyed to the shaft 13, for engagement with one of the gears 14 and 15. Depending on the position of the clutch member, the shaft 18 will be rotated in one direction or the other. The gear 25 keyed to the shaft 18 meshes with the gear 26. The screw shaft 28 is loosely keyed to gear 26 by a lost motion device 27 involving a key on the shaft loosely fitting with a wide slot on the inside of the gear hub. This shaft, as illustrated in the drawings, is mounted at one end in the box 29 which carries the reversing mechanism and at the other in suitable bearings in the machine base 10. The shaft is screw threaded throughout a considerable portion of its length and is adapted to cooperate with a suitable nut fastened to the under side of the machine table 11 to reciprocate the same.

The construction so far described is of an ordinary mechanism which may be suitably modified as desired. In order to transmit power from the reversibly rotating screw threaded shaft 28 to the machine table, I propose to employ a nut which is movable relative to the table in a predetermined manner to permit the table to be accelerated gradually at each reversal in direction. To this end I so connect a nut 30 with the table that it may travel in a direction parallel with the motion of the table at a varying rate which initially serves to neutralize, as it were, the forward lead of the screw and prevent it moving the table. This movement of the nut relative to the table is then gradually retarded in such a manner as to provide an increasing thrust upon the table which causes the table to move at an increasing rate until it reaches its normal full speed.

To this end I mount the nut 30 for rotation as well as longitudinal movement within bearings in the projection 31 depending from the under side of the table. Keyed on the ends of the nut are two cam members 32 and 33 which, as shown in elevation in Fig. 4, have cam surfaces 34 and 35 of suitable shape. These preferably conform to the shape of a gravity curve, as modified by the characteristics of the particular machine in which they are mounted. Bearing on these cam surfaces are rollers 37 and 38 mounted on pins 39 fixed on the depending member 31, these parts being so arranged that roller 37 is at the upper end of its cam path when roller 38 has reached the lower end of its path, and vice versa.

To cause an automatic reversal of the table, I may utilize any of the well known load and fire mechanisms to throw the reverse clutch. I have illustrated a mechanism (Figs. 2 and 5) of a simplified construction which is operated directly by the table 11. In this construction the yoke member 43 engaging the annular groove 44 on the clutch 22 is slidably mounted upon a shaft 46 which is journaled in the base. The fingers 48 and 49, pivotally mounted on the inside of the base, are adapted to engage a projection 50 on the yoke member 43. The upper ends of the fingers 48 and 49 are provided with studs having a spring 52 interposed therebetween. The lower ends of the fingers 48 and 49 are adapted to alternately engage opposite sides of the projection 50 as the yoke member 43 moves to shift the clutch 22. I provide the yoke member 43 with two plungers 53 held by springs 54 which are adapted to be acted upon by a pivotally mounted lever 55. The lever 55 is provided with a fixed pin 56 extending either side of the lever 55 and adapted to engage the upper ends of the fingers 48 and 49. As shown in Fig. 5, if the lever 55 swings to the right, the right hand spring pressed plunger 53 will be acted upon and compress the spring. This action will continue until the pin 56 on the lever 55 contacts with upper end of the finger 49 and moves the same so that the lower end will be raised and unlock the projection 50. As soon as the finger 49 has been unlocked, the tension of the right hand spring 54 will rapidly throw the yoke 43 to the right and consequently the clutch into the reverse position. As soon as the yoke 43 has moved the required distance, the spring 52 acts and throws the finger 48 into a locked position against the projection 50 and thus holds the clutch in the reverse position.

To effect the operation of the load and fire mechanism, I may provide any suitable connections whereby the movement of the table 11 may be utilized. As illustrated, the lever 55 is pivoted to the inside of the base on the rotatable stud 57. To the outer end of the stud 57 is fixed a yoke lever 58 so that the levers 55 and 58 are substantial as a single lever. The yoke of the lever 58 is adapted to be moved by the rod 60, which is slidably mounted in suitable bearings 62 on the base, only one of which is shown in Fig. 2, by being interposed between the two fixed collars 63 and 64 on the rod. The rod is provided with the adjustable dogs 65 and 66 which are positioned so as to be acted upon by a fixed stop 67 depending from the table.

In explanation of the operation of my driving and reversing mechanism, assume that it is desired to start the table towards the left by rotating shaft 28 in the direction of the arrow as shown in Fig. 1. The cam roller 37 is initially at the top of the path 34, and the roller 38 at the bottom of the path 35, as shown in Fig. 4, so that when the shaft 28 first starts to rotate, the thrust due to the inertia of the stationary table will result in the nut 30 being rotated by the screw. The cam roller 37 will permit the nut to travel relative to the table at a variable rate depending always upon the shape of the cam path 34. The first part of the cam path is so shaped that the nut starts rotating with the screw without imparting thrust to the table, but as the roller 37 moves along the cam at a slower longitudinal rate, an increasing thrust is imparted thereto and the table is forced to start into motion. This motion increases until by the time the roller has gone the length of the cam and struck the abutment at the end of the path the table is traveling full speed. No further relative motion between table and nut being thereafter permitted, the table is driven normally until the clutch is thrown. When the table has been brought to rest, it is started gradually in the opposite direction by the other cam and cam roller coming into action. The lost motion between the lugs on shaft 28 and gear 26 permits the table to stop gradually under its own momentum.

Having thus described my invention, what I claim as new and desire to secure by Letters Patent is:

1. In a machine tool having a reciprocating table, a driving and reversing mechanism therefor comprising a driving screw, a nut on the screw movably connected with said table, means to rotate said screw in opposite directions, and connections between said nut and table effective to start the table gradually into motion from rest and thereafter drive it at its normal speed until reversal in direction of the screw.

2. In a machine tool having a reciprocating table, means to reciprocate the same comprising a driving screw, means to rotate the same in opposite directions, a nut on said screw, and connections comprising co-operating cam members between said nut and table effective to start the table gradually into motion when the screw is first rotated and thereafter drive it at a normal rate.

3. In a machine tool having a reciprocable table, a driving and reversing mechanism therefor comprising a driving screw, means to rotate the same at a uniform rate in opposite directions, a nut on said screw having a cam thereon, a cam follower on the table cooperating with the cam and a bearing on said table supporting said nut rotatably and longitudinally movable therein, said parts being so constructed and arranged that the end thrust to move said table is transmitted only through the cam and cam follower and said cam being shaped relative to the screw so as to cause the table start gradually in motion as the cam follower moves along the surface of the cam.

4. In a machine tool having a reciprocable table, a driving and reversing mechanism therefor comprising a nut rotatably and longitudinally movable relative to said table, a driving screw cooperating with said nut, means to rotate said screw uniformly in opposite directions, cams on said nut having circular inclined paths and cam followers on the table, said cam parts being constructed and arranged to cause the nut to move relative to said table at a gradually retarded rate while the screw is rotating at uniform velocity until the nut and table are traveling uniformly together.

5. In a machine tool having a reciprocable table, a nut mounted on the table for rotation and axial movement relative thereto, cams on the opposite ends of said nut and cam followers on the table engaging said cams to move the table when the nut is moved axially, a driving screw cooperating with said nut and means to rotate the screw in opposite directions for variable periods of time, said cam parts being so constructed and arranged relative to the nut that initial rotation of the screw causes the nut to rotate and move axially relative to the table at a gradually retarded rate and thereby start the table gradually into motion.

Signed at Westboro, Massachusetts, this 3d day of May, 1922.

WARREN F. FRASER.